WILLIAM KLINKERFUES.
Improvement in Apparatus for Lighting Gas by Electricity
No. 122,389. Patented Jan. 2, 1872.
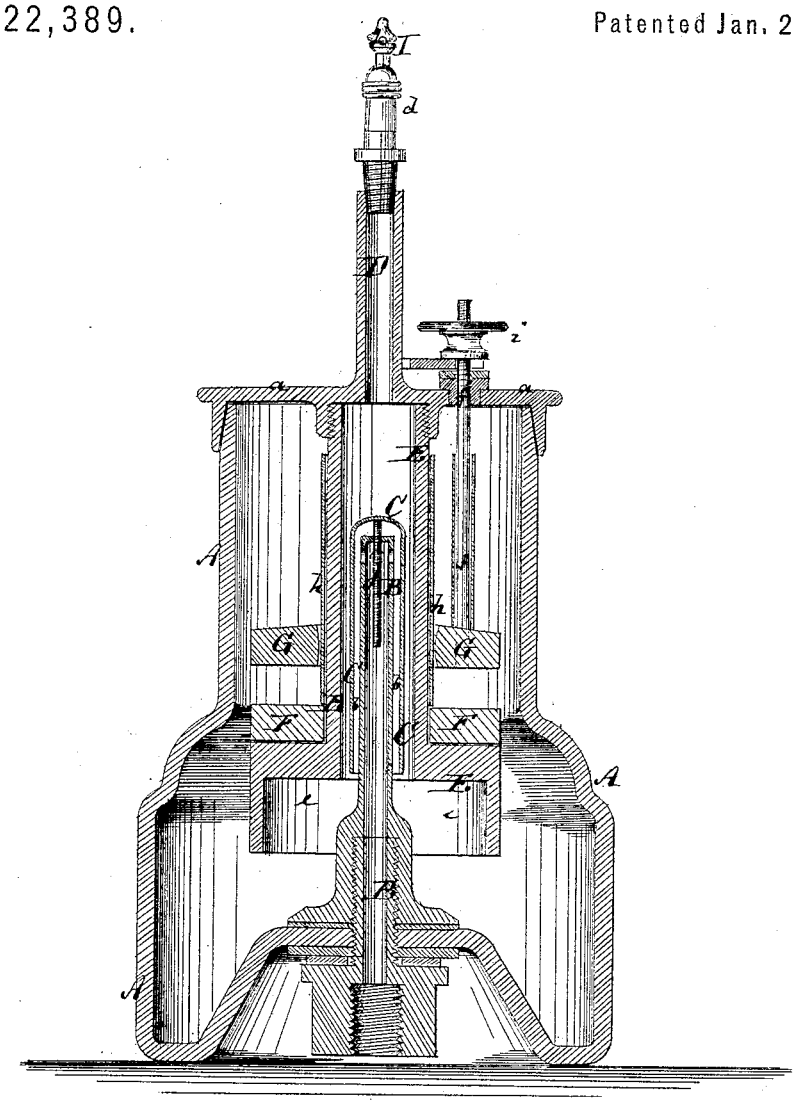
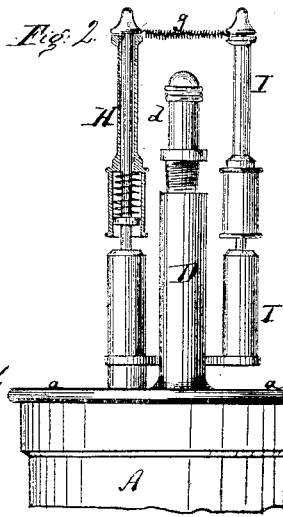
Fig. 2
Witnesses:
Chas. Nida
Francis McArdle
Inventor:
Wm. Klinkerfues
per Munn & Co
Attorneys.

UNITED STATES PATENT OFFICE.

WILLIAM KLINKERFUES, OF GOTTINGEN, GERMANY.

IMPROVEMENT IN APPARATUS FOR LIGHTING GAS BY ELECTRICITY.

Specification forming part of Letters Patent No. 122,389, dated January 2, 1872.

Specification describing a new and Improved Gas-Lighting Apparatus, invented by WILLIAM KLINKERFUES, of Gottingen, Germany.

Figure 1 represents a vertical central section of my improved gas-lighting apparatus. Fig. 2 is a detail side view of the upper portion of the same.

Similar letters of reference indicate corresponding parts.

This invention relates to a modification of the gas lighting apparatus for which Letters Patent of the United States numbered 114,950 were issued to me on the 16th day of May, 1871. The present invention has for its object to produce the requisite contact of the exciting liquid with the carbon and zinc elements of the battery by increased pressure of the gas flowing to the burner to be lighted, and thus to dispense with the necessity of mechanical action, except in as far as the turning on of the gas is concerned.

My new apparatus contains one of the elements suspended above and the other dipped into the exciting liquid which surrounds the capped end of the gas-supply pipe, so that the gas at all times exerts a certain degree of pressure upon part of the surface of the liquid. When this pressure is properly increased the liquid is raised to the suspended element, and causes, by contact therewith, a current to be established. The platinum wire held over the burner is thereby catalytically affected and causes the ignition of the gas escaping the burner, as has been fully set forth in the specification pertaining to my above-named Letters Patent.

A in the drawing represents a vessel, made of glass or equivalent material, of suitable size and shape. B is the gas-supply pipe, entering the vessel A through the bottom, and terminating within some distance below the cover or cap $a$ of said vessel. C is an inverted thimble placed over the open or perforated upper end of the pipe B, and extending some distance down, leaving an annular space, $b$, around the upper part of said pipe B. From the cover $a$ of the vessel A extends the gas-pipe D to the burner $d$, as shown. Under the open lower end of the pipe D is suspended from the cover $a$ a larger tube, E, which embraces also the thimble C, and is enlarged below the lower end of the same, as is clearly shown at $e$ in Fig. 1. F is the carbon element of the battery, placed around the tube E preferably, so as to rest on top of the enlargement $e$. It is, by means of the metal tube E and cap $a$, in metallic connection with one of the electrodes H. G is the zinc element of the battery held suspended, by a wire or rod, $f$, from the cap $a$, so as to be above the plate F, but also around the tube E, as shown. The rod $f$, which is properly insulated from the cap $a$, is in metallic connection with the other electrode, I. The platinum wire to be catalytically affected is held by the electrodes above the burner $d$. The annular plate G of zinc is, by a rubber or equivalent coating, $h$, insulated from the tube E. A nut, $i$, is or may be applied to the rod $f$ to regulate the distance between the plates F and G in accordance with the pressure of the gas. The thimble C is, by preference, also fastened to the upper end of the pipe B by a screw, $j$, so that it may be vertically adjusted on said pipe in accordance with the height of exciting liquid and pressure of gas. The exciting liquid, consisting preferably of the well-known mixture of bichromate of potassa and diluted sulphuric acid, fills the vessel A about to the height of the upper surface of the carbon plate F.

The gas pressure, when reduced, as is usually done at day-time, causes the liquid to be slightly lower within the tube E than without the same, and leaves the lower end of the thimble C immersed in the liquid. The latter serves, therefore, as a lock to the pipe B, and prevents the escape of gas therefrom as long as the same is under reduced pressure, as stated. By increasing the gas pressure the liquid is, within the tube E, carried down, so that its surface will be about in line with the top of the enlargement $e$. This will bring the liquid away from the lower end of the thimble C, open the annular space $b$, and allow the gas to escape from the pipe B, through the space $b$, tube E, and pipe D, to the burner. The tube E, having its lower end constantly immersed in the liquid, forms a partition, which prevents the gas from reaching the outer part of the vessel A. Said outer part is, by an aperture in the cover $a$, in communication with the atmosphere. The gas pressure causes the liquid to ascend in the outer part of the vessel A whenever it depresses it within the tube E. While the liquid was as high in the tube E as to shut off the gas-escape its inner lower level was much less extensive than the outer higher level around said tube. This circumstance aids in a quick lowering of the inner level whenever pressure is increased, and insures, therefore, precision in the admitting of gas to the burner, while the ascent of the liquid in the outer part of the vessel is, owing to the enlarged area, much slower. The liquid is, by this slow ascent during ordinary night pressure, which is sufficient to keep the gas-escape open, prevented from rising in contact with the zinc plate G.

For causing ignition the ordinary pressure used for burning is somewhat increased during a few moments. The pressure upon the lower lever carries the surface into the enlargement e, and causes now a more rapid ascent, owing to the enlarged lower surface. The liquid is thereby brought in contact with the plate G and the platinum wire affected in the manner substantially described in my aforesaid Letters Patent.

The platinum wire I propose to use in a coiled form, as it is more durable and certain in operation than the straight wire.

In order to guard against a lowering of the liquid level within the vessel A by evaporation the said vessel may be retained in constant connection with a supply-reservoir, which, however, can, in practice, be safely dispensed with.

Having thus described my invention, I claim as new and desire to secure by Letters Patent—

1. The gas-lighting apparatus composed of a battery whose exciting liquid serves to shut off the gas escape and to yield to increased pressure of the gas, substantially as herein shown and described.

2. The tube e, suspended from the cover a of the vessel A into the exciting liquid, and provided with the enlargement e at the lower end, substantially as and for the purpose herein shown and described.

3. The thimble C, placed over the gas-supply pipe B and within the tube E, substantially as herein shown and described.

4. The combination of the galvanic plates F and G with the tube E and vessel A, all so arranged that the liquid in A, when in its normal position, will not be in contact with one of said plates, as set forth.

5. The vessel A, pipe B, thimble C, and tube E, combined with the galvanic plates F G, electrodes H I, and platinum wires g, substantially as herein shown and described.

The above specification of my invention signed by me this 16th day of September, 1871.

W. KLINKERFUES.

Witnesses:
  Professor WEBER,
  Professor SCHEFFLER.

(64)